US010029232B2

(12) United States Patent
Koizumi et al.

(10) Patent No.: US 10,029,232 B2
(45) Date of Patent: Jul. 24, 2018

(54) ADSORBENT COMPOSITION, ADSORBENT-CONTAINING FILM AND METHOD FOR PRODUCING SAME

(71) Applicant: Kyodo Printing Co., Ltd., Tokyo (JP)

(72) Inventors: Shinichi Koizumi, Tokyo (JP); Midori Kato, Tokyo (JP); Akira Terada, Tokyo (JP); Yoshiyuki Nakazato, Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 154 days.

(21) Appl. No.: 14/911,559

(22) PCT Filed: Aug. 6, 2014

(86) PCT No.: PCT/JP2014/070754
§ 371 (c)(1),
(2) Date: Feb. 11, 2016

(87) PCT Pub. No.: WO2015/022896
PCT Pub. Date: Feb. 19, 2015

(65) Prior Publication Data
US 2016/0193585 A1 Jul. 7, 2016

(30) Foreign Application Priority Data

Aug. 12, 2013 (JP) ................................. 2013-167710

(51) Int. Cl.
| *B01J 20/18* | (2006.01) |
| *B01J 20/16* | (2006.01) |
| *B65D 81/26* | (2006.01) |
| *B65D 65/40* | (2006.01) |
| *B01J 20/28* | (2006.01) |
| *B01J 20/26* | (2006.01) |
| *B01J 20/30* | (2006.01) |
| *C08K 5/098* | (2006.01) |
| *B29C 47/00* | (2006.01) |
| *B29C 47/06* | (2006.01) |
| *B29C 47/92* | (2006.01) |
| *B29C 47/14* | (2006.01) |
| *C08L 101/00* | (2006.01) |
| *C08K 3/34* | (2006.01) |
| *B01J 20/22* | (2006.01) |

(52) U.S. Cl.
CPC ............. *B01J 20/18* (2013.01); *B01J 20/165* (2013.01); *B01J 20/223* (2013.01); *B01J 20/261* (2013.01); *B01J 20/28033* (2013.01); *B01J 20/3007* (2013.01); *B29C 47/0021* (2013.01); *B29C 47/065* (2013.01); *B29C 47/14* (2013.01); *B29C 47/92* (2013.01); *B65D 65/40* (2013.01); *B65D 81/26* (2013.01); *C08K 3/34* (2013.01); *C08K 5/098* (2013.01); *C08L 101/00* (2013.01); *B01J 2220/46* (2013.01); *B29C 2947/92704* (2013.01); *C08K 2201/014* (2013.01)

(58) Field of Classification Search
CPC ........ B01J 20/18; B01J 20/165; B01J 20/223; B01J 20/261; B01J 20/28033; B01J 20/3007; B29C 47/0021; B29C 47/065; B29C 47/14; B29C 47/92; B65D 65/40; B65D 81/26; C08K 3/34; C08K 5/098; C08L 101/00
See application file for complete search history.

(56) References Cited

U.S. PATENT DOCUMENTS

| 4,000,234 | A | * | 12/1976 | Pilgrim ............... B29C 47/0009 264/210.1 |
| 5,925,696 | A | | 7/1999 | Wehner et al. |
| 8,728,347 | B2 | | 5/2014 | Ichihara et al. |
| 9,205,960 | B2 | | 12/2015 | Muramoto et al. |
| 2011/0077149 | A1 | | 3/2011 | Ichihara et al. |
| 2012/0125806 | A1 | * | 5/2012 | Yagi ..................... B65D 75/327 206/531 |
| 2012/0193576 | A1 | * | 8/2012 | Muramoto ............. B65D 25/14 252/194 |

FOREIGN PATENT DOCUMENTS

| CN | 101229508 A | 7/2008 |
| CN | 102029143 A | 4/2011 |
| CN | 102575072 A | 7/2012 |
| CN | 102617915 A | 8/2012 |
| EP | 0111896 B1 | 3/1987 |
| JP | 56-4642 A | 1/1981 |
| JP | 59-133243 A | 7/1984 |
| JP | 61-51043 A | 3/1986 |
| JP | 2000-221640 A | 8/2000 |
| JP | 2008-69223 A | 3/2008 |
| JP | 2009-270017 A | 11/2009 |
| WO | 2011/052433 A1 | 5/2011 |

OTHER PUBLICATIONS

Supplementary European Search Report dated Mar. 1, 2017 issued in corresponding EP 14836951 application (10 pages).
(Continued)

*Primary Examiner* — Melvin C. Mayes
*Assistant Examiner* — Michael Forrest
(74) *Attorney, Agent, or Firm* — Millen White Zelano & Branigan, PC

(57) ABSTRACT

The purpose of the present invention is to provide an adsorbent composition which can be easily formed into a film by inflation molding at relatively low temperatures even if zeolite is contained therein, and which is not susceptible to the formation of a pin hole. An adsorbent composition which is a resin composition containing a resin, zeolite and a metal soap, and wherein the metal soap contains a long-chain fatty acid calcium, which is a divalent salt of calcium and a long-chain fatty acid having 5-30 carbon atoms, and a long-chain fatty acid zinc, which is a divalent salt of zinc and a long-chain fatty acid having 5-30 carbon atoms.

19 Claims, No Drawings

(56) References Cited

OTHER PUBLICATIONS

International Search Report dated Nov. 4, 2014 issued in corresponding PCT/JP20141070754 application (pp. 1-2).
English Abstract of JP 56-004642 A published Jan. 19, 1981.
English Abstract of JP 61-051043 A published Mar. 13, 1986.
English Abstract of JP 2000-221640 A published Aug. 11, 2000.
English Abstract of JP 2008-069223 A published Mar. 27, 2008.
English Abstract of JP 2009-270017 A published Nov. 19, 2009.
Chinese Office Action dated Oct. 31, 2016 issued in corresponding CN 201480044740.3 application (8 pages).
English Machine Translation of EP 0111896 A1 published Jun. 27, 1984.
English Abstract of CN 101229508 A published Jul. 30, 2008.
English Abstract of CN 102617915 A published Aug. 1, 2012.

* cited by examiner

ADSORBENT COMPOSITION, ADSORBENT-CONTAINING FILM AND METHOD FOR PRODUCING SAME

TECHNICAL FIELD

The present invention relates to an adsorbent composition, an adsorbent-containing film formed from that adsorbent composition, and a method for producing the same.

BACKGROUND ART

Products such as foods and pharmaceuticals are susceptible to water (moisture) and may absorb water. If this occurs, foods may spoil or mold may grow thereon, while pharmaceuticals may undergo deterioration of the medicinal properties thereof or a decrease in performance. Consequently, packets having a desiccant such as silica gel sealed therein have conventionally been placed in food and pharmaceutical packaging. However, the work of placing packets of desiccants in packaging has frequently been performed manually making it labor-intensive. In addition, there was also the risk of such packets being swallowed or consumed accidentally. Consequently, there has been a desire to provide packaging per se with a function that allows it to absorb water and the like.

Moreover, since some foods and pharmaceuticals are susceptible to oxidative degradation while some products have a characteristic odor, there has also been a desire to absorb oxygen and odors present in packaging.

In response to such desires, Patent Document 1 discloses a desiccant-incorporating resin composition and a desiccant-incorporating resin formed product that uses that composition. Here, after having mixed a molecular sieve which is a desiccant with a base resin having a melt flow index (MFR) of 10 or more followed by forming into a pelletized resin, an ethylene-acrylic acid ester-maleic anhydride copolymer is mixed as an additive with the pelletized resin to fabricate a desiccant-incorporating resin composition. Moreover, this desiccant-incorporating resin composition is subjected to extrusion formation or injection formation to fabricate a desiccant-incorporating resin formed product.

Molecular sieves are porous particulate substances that are used to separate substances according to differences in molecular size, have a structure that has uniform pores, and are typically synthetic zeolite that has the action of a type of sieve that absorbs small molecules that enter voids within the pores. Since the substance absorbed differs according to the size of the pores, water, water vapor or organic gas and the like can be absorbed. Since the containing of a molecular sieve makes it possible to provide packaging per se with the ability to absorb water, water vapor or organic gas (odors), spoilage or deterioration and the like of the contents thereof is thought to be able to be prevented without having to separately place a packet containing a desiccant in the packaging.

PRIOR ART DOCUMENTS

Patent Documents

Patent Document 1: Japanese Unexamined Patent Publication No. 2003-192908

DISCLOSURE OF THE INVENTION

Problems to be Solved by the Invention

In Patent Document 1, an ethylene-acrylic acid ester-maleic anhydride copolymer which is an additive has polar groups that enhance affinity between a molecular sieve and a base resin, resulting in favorable affinity between the molecular sieve and base resin and enhancing melt flowability of the desiccant-incorporating resin composition, and thereby making it possible to improve formability and smoothness of the surface of a formed product.

However, when extrusion formation or injection formation is carried out using this desiccant-incorporating resin composition of Patent Document 1, foaming occurs due to moisture and the like contained in the desiccant as a result of using at a relatively high temperature. Although film formation is possible at a comparatively low temperature if molding is carried out by inflation formation (blown film extrusion), in the case of attempting to produce a film by inflation formation at a low temperature, flowability (melt flowability) of this resin composition within the device decreases and deteriorated resin forms in the device where the resin composition is retained, thereby resulting in the problem of the formation of pinholes in the resulting film. In addition, as a result of the resin composition adhering to the walls of a kneading extruding machine or inflation machine, deteriorated resin forms and solidifies resulting in the formation of pinholes during film formation.

Moreover, in the case of incorporating zeolite in the resin composition, friction between the resin composition and screw increases during resin pellet fabrication and in the resin extrusion step during inflation formation, and a high level of frictional heat is generated that causes resin deterioration and solidification of the resin composition, thereby also resulting in the problem of the formation of pinholes during film formation.

With this in mind, an object of the present invention is to solve the aforementioned problems, namely provide an adsorbent composition that facilitates the formation of a film by inflation formation at a relatively low temperature even if containing an inorganic adsorbent in the form of zeolite and is not susceptible to the formation of pinholes. Moreover, an object of the present invention is to provide a film that absorbs water, water vapor and organic gas and the like using that composition, and a method for producing that film.

Means for Solving the Problems

The inventors of the present invention found that, in the case of using a metal soap combining a calcium salt of a long-chain fatty acid and a zinc salt of a long-chain fatty acid, an adsorbent composition can exhibit superior formability that would not be able to be foreseen from the case of using these alone or the case of combining with other metal soaps, thereby leading to completion of the present invention. Namely, the present invention is as described below.

[1] An adsorbent composition that is a resin composition containing a resin, zeolite and a metal soap, wherein the metal soap contains a calcium salt of a long-chain fatty acid which is a divalent salt of a long-chain fatty acid having 5 to 30 carbon atoms and calcium, and a zinc salt of a long-chain fatty acid, which is a divalent salt of a long-chain fatty acid having 5 to 30 carbon atoms and zinc.

[2] The adsorbent composition of [1], wherein the molar ratio of the calcium salt of a long-chain fatty acid to the zinc salt of a long-chain fatty acid is 0.5 to 5.0.

[3] The adsorbent composition of [1] or [2], wherein the metal soap is contained at 0.5% by weight to 5.0% by weight relative to the resin.

[4] The adsorbent composition of any one of [1] to [3], wherein the zeolite is contained at 30% by weight or more relative to the entire composition.

[5] The adsorbent composition of any one of [1] to [4], wherein the calcium salt of a long-chain fatty acid and the zinc salt of a long-chain fatty acid are calcium stearate and zinc stearate, respectively.

[6] The adsorbent composition of any one of [1] to [5], wherein the melt flow rate of the resin is 10 g/10 minutes or more in the case of measuring in accordance with JIS K7210 under conditions of a temperature of 190° C. and load of 21.18 N.

[7] The adsorbent composition of any one of [1] to [6], wherein the resin contains a polyethylene-based resin and/or a polypropylene-based resin.

[8] An adsorbent-containing film obtained by forming the adsorbent composition of any one of [1] to [7].

[9] The adsorbent-containing film of [8], wherein the film is formed by inflation formation.

[10] A packaging material laminate at least containing the adsorbent-containing film of [9] and a barrier film.

[11] A packaging body obtained by adhering the packaging material laminates of [10] or adhering the packaging material laminate of [10] with a laminate having heat sealability.

[12] A method for producing an adsorbent-containing film, comprising: a step for obtaining an adsorbent composition by mixing 30% by weight or more of zeolite, a polyethylene-based resin and a metal soap; wherein, the polyethylene-based resin has a melt flow rate of 10 g/10 minutes or more in the case of measuring in accordance with JIS K7210 under conditions of a temperature of 190° C. and load of 21.18 N, the metal soap contains calcium stearate and zinc stearate, and the molar ratio of the calcium stearate to the zinc stearate is 1.4 to 2.8, and the metal soap is contained at 1.4% by weight to 3.4% by weight relative to the polyethylene-based resin; and, a step for forming the adsorbent composition by inflation formation at a temperature of 150° C. to under 200° C.

Effects of the Invention

According to the present invention, an adsorbent composition can be provided that facilitates the formation of a film by inflation formation at a relatively low temperature even if zeolite is contained therein and is not susceptible to the formation of pinholes. In addition, a film produced using this adsorbent composition allows the providing of a packaging material that is able to prevent spoilage or deterioration and the like of the contents thereof as a result of absorbing water, water vapor, organic gas and the like. Consequently, the use of a packaging material fabricated using the film of the present invention makes it possible to eliminate the bother of having to separately place a packet containing a desiccant in a package and eliminates the risk of accidental swallowing or consumption.

EMBODIMENT FOR CARRYING OUT THE INVENTION

The following provides an explanation of embodiments of the adsorbent composition of the present invention, a film formed using that composition, and a method for producing that film.

<Adsorbent Composition>

The adsorbent composition of the present embodiment contains a resin, zeolite and a metal soap, and the metal soap contains a calcium salt of a long-chain fatty acid, which is a divalent salt of a long-chain fatty acid having 5 to 30 carbon atoms and calcium, and a zinc salt of a long-chain fatty acid, which is a divalent salt of a long-chain fatty acid having 5 to 30 carbon atoms and zinc. An adsorbent composition having this composition demonstrates favorable slippage of the composition, thereby reducing friction between a screw and the adsorbent composition during extrusion (when fabricating resin pellets or during inflation formation). As a result, resin deterioration can be prevented and solidification of the adsorbent composition as well as the formation of pinholes can also be prevented. In addition, since this adsorbent composition enhances the affinity between the zeolite and resin, it is not susceptible to the formation of pinholes due to its favorable adhesion.

The melt flow index of this adsorbent composition is preferably 1.0 g/10 minutes or more or 1.3 g/10 minutes or more in the case of measuring in accordance with JIS K7210 under conditions of a temperature of 190° C. and load of 21.18 N. In addition, the melt flow index is preferably 15 g/10 minutes or less or 10 g/10 minutes or less in order to be suitable for inflation formation.

(Resin)

Although there are no particular limitations thereon, the resin used in the present embodiment preferably has a high melt flow rate (MFR), low melting point (low softening point) and superior low-temperature drawdown. A resin having high drawdown is able to ensure a certain degree of flow properties even if MFR decreases due to the addition of a relatively large amount of zeolite. The melt flow rate of the resin used in the present embodiment is preferably 1 g/10 minutes or more, 3 g/10 minutes or more, 5 g/10 minutes or more, 10 g/10 minutes or more or 20 g/10 minutes or more in the case of measuring in accordance with JIS K7210 under conditions of a temperature of 190° C. and load of 21.18 N.

From this viewpoint, examples of resins used in the present invention include polyolefin-based resins, and particularly polyethylene-based resins and polypropylene-based resins. Specific examples of polyethylene-based resins include low-density polyethylene (LDPE), linear low-density polyethylene (LLDPE), medium-density polyethylene (MDPE), high-density polyethylene (HDPE), ethylene-acrylic acid copolymer (EAA), ethylene-methacrylic acid copolymer (EMAA), ethylene-ethyl acrylate copolymer (EEA), ethylene-methacrylate copolymer (EMA), ethylene-vinyl acetate copolymer (EVA), carboxylic acid-modified polyethylene, carboxylic acid-modified polyethylene-vinyl acetate copolymer, ionomers, derivatives thereof and mixtures thereof, while specific examples of polypropylene-based resins include polypropylene (PP) homopolymers, random polypropylene (random PP), block polypropylene (block PP), chlorinated polypropylene, carboxylic acid-modified polypropylene, derivatives thereof and mixtures thereof.

(Zeolite)

Zeolite is used as an adsorbent in the composition of the present embodiment. Without being bound by theory, since zeolite is based on aluminosilicate, its polar moiety (aluminum moiety) interacts with the metal ion and/or long-chain fatty acid of the metal soap to be subsequently described, and the metal soap is thought to be coordinated by the zeolite, thereby contributing to reduction of friction with the metal moiety in an extruding machine. Thus, the composition of the present embodiment is able to impart advantageous effects as a result of the adsorbent being zeolite.

Examples of zeolite able to be used in the present embodiment include natural zeolite, artificial zeolite and synthetic zeolite. Since zeolite is a porous particulate substance that is used to separate substances according to differences in molecular size, has a structure having uniform pores, and has the action of a type of sieve by absorbing small molecules that enter voids within the pores, it is able to absorb water (steam, water vapor), organic gas and the like. One example of synthetic zeolite is a molecular sieve, and among these, a molecular sieve having a pore (absorption opening) diameter of 0.3 nm to 1 nm can be used in particular. Molecular sieves having a pore diameter of 0.3 nm, 0.4 nm, 0.5 nm and 1 nm are normally referred to as 3 A molecular sieves, 4 A molecular sieves, 5 A molecular sieves and 13× molecular sieves, respectively. A molecular sieve having an average particle diameter (diameter having an integrated value of 50% in a particle size distribution determined by laser diffraction/scattering) of about 10 μm is used. In the present invention, these zeolites can be used appropriately according to the target substance to be adsorbed or the properties of the contents and the like.

In addition, in the case of absorbing odors in particular, since organic gas is frequently the causative substance, hydrophobic zeolite is used preferably. Hydrophobic zeolite is the generic term for so-called high-silica zeolite in which the silica/alumina ratio has been increased by decreasing the number of aluminum atoms present in the crystal framework of the zeolite by subjecting to dealumination treatment. Hydrophobic zeolite loses its affinity for water and other polar substances while strongly absorbing nonpolar substances, thereby facilitating the absorption of organic gas and the like. A hydrophobic molecular sieve having a pore diameter of 0.6 nm to 0.9 nm can be used as one example of hydrophobic zeolite, and examples thereof include the Abscents 1000, Abscents 2000 and Abscents 3000 (manufactured by Union Showa K.K.). Pore diameter can be confirmed by structural analysis by X-ray diffraction. In addition, hydrophobic zeolite is used that has an average particle diameter (particle diameter having an integrated value of 50% in a particle size distribution determined by laser diffraction/scattering) of, for example, 3 μm to 5 μm.

The mixing ratio of zeolite in the adsorbent composition is preferably 3% by weight or more, 5% by weight or more, 10% by weight or more, 20% by weight or more, 30% by weight or more, 40% by weight or more or 50% by weight or more, and preferably 60% by weight or less, based on the entire adsorbent composition. If the zeolite mixing ratio is high, the adsorption performance of a formed product thereof in the form of a film increases, thereby enabling the film to adequately absorb water and organic gas. In addition, if the zeolite mixing ratio is low, formability is favorable and a film can be easily formed by inflation formation. The zeolite mixing ratio can be selected within the aforementioned ranges corresponding to the packaging form and contents. If the weight ratio is within the aforementioned ranges, a film having favorable formability and suitable absorption performance can be provided.

(Metal Soap)

The adsorbent composition of the present embodiment contains a metal soap that uses a combination of a calcium salt of a long-chain fatty acid, which is a divalent salt of a long-chain fatty acid having 5 to 30 carbon atoms and calcium, and a zinc salt of a long-chain fatty acid, which is a divalent salt of a long-chain fatty acid having 5 to 30 carbon atoms and zinc. A metal soap employing this combination has favorable slippage and is able to inhibit the presence of residual resin in an extruding machine, and since it is also able to reduce friction between the screw and the adsorbent composition during extrusion (when fabricating resin pellets or during inflation formation), it is able to prevent resin deterioration during extrusion while also preventing the formation of pinholes. This type of metal soap is highly effective in the case of using a resin having high metal adhesiveness in particular. In addition, since a metal soap employing this combination is able to improve compatibility by enhancing affinity between the zeolite and resin, adhesion at the interface between the zeolite and resin can be improved. As a result, it also has the action of reducing susceptibility to the formation of pinholes.

Although details of the principle thereof are unclear, since the calcium salt of a long-chain fatty acid lowers adhesiveness between the walls of the kneading machine or extruding machine and the resin, the resin composition is thought to easily flow within the machine even if the resin composition contains a relatively large amount of zeolite. This is also thought to be able to prevent changes in zeolite concentration and resin deterioration attributable to the presence of residual resin in the machine. In addition, friction occurs between the resin composition and the screw of a kneading machine and the like, and since this friction tends to increase as the amount of zeolite increases, the screw may become worn. The zinc salt of a long-chain fatty acid is thought to have a function that prevents deterioration of resin attributable to frictional heat by reducing this friction.

The aforementioned long-chain fatty acid may be a saturated fatty acid or unsaturated fatty acid. Examples of this saturated fatty acid or unsaturated fatty acid include, but are not limited to, lauric acid, myristic acid, palmitic acid, stearic acid, arachidic acid, behenic acid, oleic acid, linoleic acid, linolenic acid, palmitoleic acid, isostearic acid, hydroxystearic acid, ricinoleic acid and montanic acid. The number of carbon atoms of the long-chain fatty acid of the aforementioned calcium salt of a long-chain fatty acid and zinc salt of a long-chain fatty acid is preferably within the range of 10 to 25 and more preferably within the range of 12 to 20.

The molar ratio of the calcium salt of a long-chain fatty acid to the zinc salt of a long-chain fatty acid is preferably 0.5 to 5.0, more preferably greater than 1.0 to less than 4.2, even more preferably 1.2 to 3.5 and still more preferably 1.4 to 2.8. It was determined that, if the molar ratio is within the aforementioned ranges, friction between the screw and resin composition during extrusion (when fabricating resin pellets or during inflation formation) is reduced, adhesion between the resin and the walls of a kneading extruding machine or inflation machine is lowered, resin deterioration is prevented, and the formation of pinholes during film formation caused by solidification of the resin composition in particular can be prevented.

In the present invention, since it is important to properly demonstrate both of these functions, the formation of pinholes during film formation cannot be inhibited if either the calcium salt of a long-chain fatty acid or zinc salt of a long-chain fatty acid is used alone. Furthermore, in the case the amount of the zinc salt of a long-chain fatty acid is high within the aforementioned ranges of molar ratios, it is thought that friction between the screw of the kneading machine and the resin composition decreases, there is less susceptibility to deterioration of resin caused by frictional heat, and there is less susceptibility to formation of pinholes during film deposition. In addition, in the case the amount of the calcium salt of a long-chain fatty acid is high within the aforementioned ranges of molar ratios, the function of reducing adhesion between the resin and the walls of a kneading machine or extruding machine and facilitating flow of the resin composition is demonstrated more prominently, thereby making it possible to prevent changes in zeolite concentration and resin deterioration attributable to the presence of residual resin. A description thereof is subsequently provided using examples.

In addition, the metal soap is preferably contained at a total of 0.5% by weight to 5.0% by weight, more preferably at greater than 0.7% by weight to less than 4.2% by weight, even more preferably at 1.0% by weight to 3.8% by weight, and still more preferably at 1.4% by weight to 3.4% by weight relative to the aforementioned resin. In the case the content of the metal soap is sufficiently high, since the function of reducing friction between the screw of a kneading machine and the resin composition and the function of lowering adhesion between the resin and the walls of a kneading machine or extruding machine are demonstrated to a high degree, the formation of deteriorated resin during extrusion formation and the formation of pinholes in a film can be prevented. In the case the content of the metal soap is excessively high, the resin may no longer be able to effectively function as a binder due to a decrease in the proportion of resin in the resin composition.

<Adsorbent-Containing Film and Production Method Thereof>

The adsorbent-containing film of the present invention can be produced by forming the aforementioned adsorbent composition into a film. Although there are no particular limitations on the formation method, inflation formation is preferable since it is able to lower the potential for foaming as a result of enabling forming to be carried out at a relatively low temperature.

In the case of producing the adsorbent-containing film of the present invention by inflation formation, the film can be produced, for example, in the manner indicated below. After mixing zeolite, resin and metal soap, mixing and dispersing with a kneader mixer or Henschel mixer and the like, and heating and kneading at 100° C. to 250° C., and preferably 150° C. to lower than 200° C., with an extruding machine, the mixture is extruded into pellets and cooled to fabricate a pelletized resin composition (master batch). At this time, an antioxidant may be added. The fabricated master batch is then reheated and a film is deposited by inflation formation to produce an adsorbent-containing film. At this time, a skin layer composed of an olefin-based resin and the like may be provided on both sides of the adsorbent-containing film to obtain an adsorbent-containing multilayer film.

The skin layer is formed by co-extruding a resin for the skin layer simultaneous to extrusion of the adsorbent composition, resulting in a three-layered film having a sandwich structure formed by the skin layers. Namely, the adsorbent-containing multilayer film has an intermediate layer in the form of an adsorbent-containing layer and an outer skin layer and inner skin layer on both sides thereof. Among these, the intermediate layer serves as a core in the form of a functional layer that is primarily responsible for absorbing water, water vapor and organic gas. In addition, since the outer skin layer and inner skin layer are laminated on the inside and outside (upward and downward in the direction of lamination) of the intermediate layer with the intermediate layer interposed there between, they primarily serve as surface layers of the intermediate layer, thereby making it possible to increase film mechanical strength and allow the obtaining of a film having a smooth surface even if the zeolite content is high. Furthermore, the inner and outer skin layers are not imparted with an absorption function. In the following descriptions, the adsorbent-containing film and the adsorbent-containing multilayer film are collectively referred to as an adsorbent-containing film.

The resulting adsorbent-containing film can be in the form of a packaging material laminate by laminating with one type of barrier film or a combination of a plurality of types of barrier films selected from, for example, polyester film, aluminum foil, silica-alumina-deposited polyester film, vinylidene chloride-coated film, vinyl chloride film or cast polypropylene (CPP). In addition, this adsorbent-containing film can be laminated with a base material such as paper normally used as a packaging material, either together with the aforementioned barrier film or in the absence of the barrier film, to obtain a packaging material laminate. A known method such as dry lamination or extrusion lamination can be used for the lamination method. A packaging body can be fabricated by heat sealing a plurality of the packaging material laminates or heat sealing the packaging material laminate with another film. Examples of forms of the packaging body include pouches, PTP, blister packs, tubes and boxes, and the packaging body can be used in a desired form.

Examples

<Sample Fabrication>

Adsorbent-containing films having the configurations described in Table 2 were produced by inflation formation using the materials described in Table 1.

TABLE 1

|  | Material | Product Name | Manufacturer |
|---|---|---|---|
| Adsorbent | Zeolite | Molecular Sieve 3A | Union Showa Co., Ltd. |
| Resin | EMAA | Nucrel AN42115C | DuPont-Mitsui Polychemicals Co., Ltd. |
| Metal Soap | Calcium stearate (StCa) | — | Sakai Chemical Industry Co., Ltd. |
|  | Zinc stearate (StZn) | — | Kawamura Kasei Industry Co., Ltd. |
|  | Magnesium stearate (StMg) | — | Sakai Chemical Industry Co., Ltd. |
| Skin Layer Resin | LLDPE | Evolue SP2520 | Prime Polymer Co., Ltd. |

Zeolite, resin and metal soap were respectively placed in a twin-screw kneading extruding machine (PCM-30, Ikegai Corp.) at their prescribed blending ratios and mixed while heating and melting followed by extruding into pellets and cooling to fabricate a master batch. This master batch was then used as the material of an intermediate layer, and an adsorbent-containing film having skin layers was deposited by co-extruding by inflation formation. The intermediate layer of the adsorbent-containing film deposited at this time had a thickness of 50 μm while the inner and outer skin layers had a thickness of 10 μm. Inflation conditions were as indicated below.

Processing machine: Model 3SOIB three-layer inflation machine
Manufacturer: Placo Co., Ltd.
Resin temperature: 180° C. for each layer
Take-up speed: 13 m/min
<Evaluation Methods>
(T-Die Film-Formability)
The master batch fabricated in the manner described above was extruded and formed a film using the T-die of a Labo Plastomill (Toyo Seiki Co., Ltd.) by fixing the resin temperature at about 180° C., the lip width of the T-die to 1 mm and the screw rotating speed to 30 rpm, followed by changing the take-up speed and evaluating the speed at which pinholes formed and the film broke. Furthermore, the correlation between film formation with another T-die and pinhole formation in a multistage inflation machine was compared. As a result, in the case the take-up speed at the T-die when the film broke was 5.0 m/min or more, the number of pinholes formed during inflation formation was less than 10/m² and stable deposition was determined to be possible. On the other hand, in the case the take-up speed at the T-die when the film broke was less than 5.0 m/min, the number of pinholes formed during inflation formation was 10/m² or more, thereby preventing stable deposition for use as a finished product.

(Pinhole Resistance)

A multilayer adsorbent-containing film was formed under the previously described inflation conditions, and the formation of pinholes was evaluated by carrying out a visual inspection. The results of the evaluation were indicated with "G" and "NG", with "G" corresponding to an acceptable result of less than 10 pinholes/m² and "NG" corresponding to an unacceptable result of 10 pinholes/m² or more. The evaluation results are shown in Table 2.

was determined to be unable to inhibit the formation of pinholes and prevent the obtaining of satisfactory film-formability.

Comparative Example 14 indicates the results of carrying out an experiment by mixing metal soaps consisting of calcium stearate and magnesium stearate. Upon examination of these results, although the blending ratio of the metal soaps relative to the resin was 2.7% by weight, which was thought to indicate that an adequate amount had been added, film-formability was inadequate. This is thought to be due to magnesium stearate not having a function that prevents deterioration of resin by frictional heat by reducing friction between the screw of the kneading machine and the resin composition in the manner of zinc stearate.

Examples 1 to 6 show the results of conducting an experiment in the case of adding both calcium stearate and zinc stearate as metal soaps and changing the blending ratios of both. A certain degree of film-formability was able to be obtained in the case of adding both calcium stearate and zinc stearate as metal soaps. In addition, in looking at Examples 2 to 5, the formation of pinholes decreased and particularly favorable film-formability was obtained in the case of blending the calcium stearate and zinc stearate at a molar ratio of 1.4 to 2.8.

TABLE 2

| | Adsorbent | Resin | Metal Soap | | | Metal Soap Blending Ratio | | MFR (g/10 min) | T-Die formability (m/min) | Pinhole Resistance |
| | | | St-Ca | St-Zn | St-Mg | Relative to Resin | StCa/StZn Molar Ratio | | | |
| --- | --- | --- | --- | --- | --- | --- | --- | --- | --- | --- |
| Comp. Ex. 1 | 55 | 45.0 | — | — | — | 0.0 | — | 0.6 | 3.5 | NG |
| Comp. Ex. 2 | 55 | 44.6 | 0.4 | — | — | 0.9 | — | 0.8 | 4.0 | NG |
| Comp. Ex. 3 | 55 | 44.2 | 0.8 | — | — | 1.8 | — | 0.9 | 4.5 | NG |
| Comp. Ex. 4 | 55 | 44.0 | 1.0 | — | — | 2.3 | — | 0.9 | 4.5 | NG |
| Comp. Ex. 5 | 55 | 43.8 | 1.2 | — | — | 2.7 | — | 0.9 | 4.5 | NG |
| Comp. Ex. 6 | 55 | 44.8 | — | 0.2 | — | 0.4 | — | 0.9 | 4.5 | NG |
| Comp. Ex. 7 | 55 | 44.6 | — | 0.4 | — | 0.9 | — | 0.9 | 4.5 | NG |
| Comp. Ex. 8 | 55 | 44.5 | — | 0.5 | — | 1.1 | — | 0.9 | 4.0 | NG |
| Comp. Ex. 9 | 55 | 44.2 | — | 0.8 | — | 1.8 | — | 0.7 | 4.0 | NG |
| Comp. Ex. 10 | 55 | 44.8 | — | — | 0.2 | 0.4 | — | 0.7 | 4.0 | NG |
| Comp. Ex. 11 | 55 | 44.6 | — | — | 0.4 | 0.9 | — | 0.7 | 4.0 | NG |
| Comp. Ex. 12 | 55 | 44.5 | — | — | 0.5 | 1.1 | — | 0.7 | 4.0 | NG |
| Comp. Ex. 13 | 55 | 44.2 | — | — | 0.8 | 1.8 | — | 0.7 | 4.0 | NG |
| Comp. Ex. 14 | 55 | 43.8 | 0.8 | — | 0.4 | 2.7 | — | 0.8 | 4.5 | NG |
| Example 1 | 55 | 44.0 | 0.8 | 0.2 | — | 2.3 | 4.2 | 0.8 | 4.5 | NG |
| Example 2 | 55 | 43.9 | 0.8 | 0.3 | — | 2.5 | 2.8 | 1.2 | 5.0 | G |
| Example 3 | 55 | 43.8 | 0.8 | 0.4 | — | 2.7 | 2.1 | 1.3 | 5.5 | G |
| Example 4 | 55 | 43.7 | 0.8 | 0.5 | — | 3.0 | 1.7 | 1.2 | 5.0 | G |
| Example 5 | 55 | 43.6 | 0.8 | 0.6 | — | 3.2 | 1.4 | 1.2 | 5.0 | G |
| Example 6 | 55 | 43.4 | 0.8 | 0.8 | — | 3.7 | 1.0 | 0.8 | 4.5 | NG |
| Example 7 | 55 | 44.7 | 0.2 | 0.1 | — | 0.7 | 2.1 | 0.9 | 4.5 | NG |
| Example 8 | 55 | 44.4 | 0.4 | 0.2 | — | 1.4 | 2.1 | 1.0 | 5.0 | G |
| Example 9 | 55 | 43.5 | 1.0 | 0.5 | — | 3.4 | 2.1 | 1.2 | 5.0 | G |
| Example 10 | 55 | 43.2 | 1.2 | 0.6 | — | 4.2 | 2.1 | 0.9 | 4.5 | NG |
| Example 11 | 52 | 46.8 | 0.8 | 0.4 | — | 2.6 | 2.1 | 1.5 | 5.5 | G |
| Example 12 | 57 | 41.8 | 0.8 | 0.4 | — | 2.9 | 2.1 | 1.1 | 5.0 | G |

* Units of amounts of each constituent material are parts by weight.
* Molecular weights: St-Ca (607), St-Zn (632)

The following provides a detailed explanation of results for each of the examples and comparative examples.

First, when an experiment was conducted under conditions of not containing any metal soap in Comparative Example 1, pinholes formed and favorable film-formability was not obtained. Next, results for the cases of respectively using metal soaps in the form of calcium stearate (St-Ca), zinc stearate (St-Zn) or magnesium stearate (St-Mg) alone are shown in Comparative Examples 2 to 13. Upon examination of these results, the use of these metal soaps alone Examples 3 and 7 to 10 show the results of an experiment in which, after having added both calcium stearate and zinc stearate as metal soaps at a prescribed ratio, the blending ratio of the total amount of metal soap was changed. In looking at these results, pinhole formation decreased in particular and favorable film-formability was obtained in the case of adding metal soap at 1.4% by weight to 3.4% by weight relative to the resin.

Examples 11 and 12 show results in the case of carrying out an experiment by changing the blending ratio of zeolite. As can be understood from these results, the present invention was determined to demonstrate adequate effects even in the case of zeolite being incorporated at 50% by weight or more relative to the entire composition.

The present invention is not restricted to the previously described embodiments and examples, and can be carried out accompanying various modifications and substitutions. In addition, the configurations and materials exemplified in the previously described embodiments and examples all indicate preferable examples thereof, and it goes without saying that they can be suitably modified.

INDUSTRIAL APPLICABILITY

The adsorbent composition of the present invention enables the formation of a film by inflation formation at a relatively low temperature even if the composition contains zeolite and is not susceptible to the formation of pinholes. The use of a packaging material fabricated using the film of the present invention makes it possible to eliminate the bother of having to separately place a packet containing a desiccant in a package and eliminates the risk of accidental swallowing or consumption.

The invention claimed is:

1. An adsorbent composition that is a resin composition containing a resin, zeolite and a metal soap, wherein the metal soap contains a calcium salt of a long-chain fatty acid which is a divalent salt of a long-chain fatty acid having 5 to 30 carbon atoms and calcium, and a zinc salt of a long-chain fatty acid which is a divalent salt of a long-chain fatty acid having 5 to 30 carbon atoms and zinc,
   wherein the molar ratio of the calcium salt of a long-chain fatty acid to the zinc salt of a long-chain fatty acid is 1.2 to 3.5, and
   wherein the metal soap is contained at 1.0% by weight to 3.8% by weight relative to the resin.

2. The adsorbent composition of claim 1, wherein the molar ratio of the calcium salt of a long-chain fatty acid to the zinc salt of a long-chain fatty acid is 1.4 to 2.8.

3. The adsorbent composition of claim 1, wherein the metal soap is contained at 1.4% by weight to 3.4% by weight relative to the resin.

4. The adsorbent composition of claim 1, wherein the zeolite is contained at 30% by weight or more relative to the entire composition.

5. The adsorbent composition of claim 1, wherein the calcium salt of a long-chain fatty acid and the zinc salt of a long-chain fatty acid are calcium stearate and zinc stearate, respectively.

6. The adsorbent composition of claim 1, wherein the melt flow rate of the resin is 10 g/10 minutes or more in the case of measuring in accordance with JIS K7210 under conditions of a temperature of 190° C. and load of 21.18 N.

7. The adsorbent composition of claim 1, wherein the resin contains a polyethylene-based resin and/or a polypropylene-based resin.

8. An adsorbent-containing film obtained by forming the adsorbent composition of claim 1.

9. The adsorbent-containing film of claim 8, wherein the film is formed by inflation formation.

10. A packaging material laminate at least containing the adsorbent-containing film of claim 9 and a barrier film.

11. A packaging body obtained by adhering the packaging material laminates of claim 10 or adhering the packaging material laminate of claim 10 with a laminate having heat sealability.

12. The adsorbent composition of claim 1, wherein the melt flow index of the adsorbent composition is 1.0 g/10 minutes or more and 15 g/10 minutes or less in the case of measuring in accordance with JIS K7210 under conditions of a temperature of 190° C. and load of 21.18 N.

13. The adsorbent composition of claim 1, wherein the melt flow rate of the resin is 20 g/10 minutes or more in the case of measuring in accordance with JIS K7210 under conditions of a temperature of 190° C. and load of 21.18 N.

14. The adsorbent composition of claim 1, wherein the zeolite is contained at 40% by weight or more relative to the entire composition.

15. The adsorbent composition of claim 1, wherein the number of carbon atoms of the long-chain fatty acid of said calcium salt of a long-chain fatty acid and zinc salt of a long-chain fatty acid is within the range of 10 to 25.

16. The adsorbent composition of claim 1, wherein the number of carbon atoms of the long-chain fatty acid of said calcium salt of a long-chain fatty acid and zinc salt of a long-chain fatty acid is within the range of 12 to 20.

17. The adsorbent composition of claim 1, wherein the resin is a polyethylene-based resin or polypropylene-based resin.

18. The adsorbent composition of claim 1, wherein the resin is selected from low-density polyethylene (LDPE), linear low-density polyethylene (LLDPE), medium-density polyethylene (MDPE), high-density polyethylene (HDPE), ethylene-acrylic acid copolymer (EAA), ethylene-methacrylic acid copolymer (EMAA), ethylene-ethyl acrylate copolymer (EEA), ethylene-methacrylate copolymer (EMA), ethylene-vinyl acetate copolymer (EVA), carboxylic acid-modified polyethylene, carboxylic acid-modified polyethylene-vinyl acetate copolymer, polypropylene (PP) homopolymer, random polypropylene (random PP), block polypropylene (block PP), chlorinated polypropylene, carboxylic acid-modified polypropylene, and mixtures thereof.

19. A method for producing an adsorbent-containing film, comprising:
   a step for obtaining an adsorbent composition by mixing 30% by weight or more of zeolite, a polyethylene-based resin and a metal soap; wherein,
      the polyethylene-based resin has a melt flow rate of 10 g/10 minutes or more in the case of measuring in accordance with JIS K7210 under conditions of a temperature of 190° C. and load of 21.18 N,
      the metal soap contains calcium stearate and zinc stearate, and the molar ratio of the calcium stearate to the zinc stearate is 1.4 to 2.8, and
      the metal soap is contained at 1.4% by weight to 3.4% by weight relative to the polyethylene-based resin; and,
   a step for forming the adsorbent composition by inflation formation at a temperature of 150° C. to under 200° C.

* * * * *